US008332299B1

(12) United States Patent
Lawson, III et al.

(10) Patent No.: US 8,332,299 B1
(45) Date of Patent: Dec. 11, 2012

(54) INVESTMENT POLICY TOOL (75) Inventors: Lonnie Thompson Lawson, III, Charlotte, NC (US); Weldon Jones, Huntersville, NC (US); Matthew Price, Cramerton, NC (US); Michael Sutor, Lexington, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 852 days.

(21) Appl. No.: 12/340,035

(22) Filed: Dec. 19, 2008

(51) Int. Cl.
*G06Q 40/00* (2012.01)
(52) U.S. Cl. ..................................... 705/36 R
(58) Field of Classification Search ............... 705/36 R, 705/35, 37
See application file for complete search history.

(56) References Cited

U.S. PATENT DOCUMENTS

| | | | | | |
|---|---|---|---|---|---|
| 5,918,217 | A | * | 6/1999 | Maggioncalda et al. | 705/36 R |
| 6,021,397 | A | * | 2/2000 | Jones et al. | 705/36 R |
| 6,064,985 | A | * | 5/2000 | Anderson | 705/36 R |
| 6,601,044 | B1 | * | 7/2003 | Wallman | 705/36 R |
| 7,177,831 | B1 | * | 2/2007 | O'Shaughnessy et al. | 705/36 R |
| 7,373,324 | B1 | * | 5/2008 | Engin et al. | 705/36 R |
| 7,430,532 | B2 | * | 9/2008 | Wizon et al. | 705/36 R |
| 7,536,332 | B2 | * | 5/2009 | Rhee | 705/36 R |
| 7,599,876 | B1 | * | 10/2009 | Lo et al. | 705/37 |
| 7,668,773 | B1 | * | 2/2010 | Pruitt | 705/36 T |
| 7,707,093 | B2 | * | 4/2010 | O'Shaughnessy et al. | 705/36 R |
| 7,778,907 | B1 | * | 8/2010 | Haskins et al. | 705/36 R |
| 7,860,774 | B1 | * | 12/2010 | Peterson et al. | 705/36 R |
| 7,873,557 | B2 | * | 1/2011 | Guidotti et al. | 705/36 R |
| 7,873,560 | B2 | * | 1/2011 | Reich et al. | 705/37 |
| 8,001,029 | B2 | * | 8/2011 | Staub | 705/36 T |
| 2002/0082979 | A1 | * | 6/2002 | Sands et al. | 705/37 |
| 2002/0138383 | A1 | * | 9/2002 | Rhee | 705/36 |
| 2002/0138389 | A1 | * | 9/2002 | Martone et al. | 705/36 |
| 2002/0156722 | A1 | * | 10/2002 | Greenwood | 705/37 |
| 2003/0083971 | A1 | * | 5/2003 | Kawamoto et al. | 705/36 |
| 2003/0088489 | A1 | * | 5/2003 | Peters et al. | 705/36 |
| 2003/0093352 | A1 | * | 5/2003 | Muralidhar et al. | 705/36 |
| 2004/0225586 | A1 | * | 11/2004 | Woods et al. | 705/35 |
| 2005/0010516 | A1 | * | 1/2005 | Ivanov et al. | 705/36 |
| 2005/0049954 | A1 | * | 3/2005 | Graham et al. | 705/36 |
| 2005/0154658 | A1 | * | 7/2005 | Bove et al. | 705/35 |
| 2005/0187851 | A1 | * | 8/2005 | Sant | 705/36 |
| 2005/0234793 | A1 | * | 10/2005 | Staub | 705/36 |
| 2005/0273409 | A1 | * | 12/2005 | Voudrie | 705/36 |
| 2006/0010053 | A1 | * | 1/2006 | Farrow | 705/35 |
| 2006/0277127 | A1 | * | 12/2006 | Pierdinock et al. | 705/35 |
| 2007/0043650 | A1 | * | 2/2007 | Hughes et al. | 705/37 |
| 2007/0043653 | A1 | * | 2/2007 | Hughes et al. | 705/37 |
| 2007/0055599 | A1 | * | 3/2007 | Arnott | 705/35 |
| 2007/0130043 | A1 | * | 6/2007 | O'Shaughnessy et al. | 705/36 R |
| 2007/0192228 | A1 | * | 8/2007 | Phelps et al. | 705/36 R |

(Continued)

*Primary Examiner* — Kenneth Bartley
(74) *Attorney, Agent, or Firm* — Stephen C. Glazier; K&L Gates LLP (57) ABSTRACT

Various embodiments provide a system for enforcing investment policies created by an account owner. An investment policy tool may receive account data from an account database, including a portfolio and a policy, and a transaction generated by a trader for the account from a trading system. The investment policy tool may use the portfolio and the transaction to generate a speculative portfolio. The transaction and the speculative portfolio may be compared with the policy, to determine if either the transaction or the speculative portfolio violates any elements of the policy. If the investment policy tool determines that the policy has been violated, the investment policy tool may stop the transaction, stop the transaction and notify the account owner of the violation, hold the transaction and request approval from the account owner, or allow the transaction to proceed and notify the account owner of the violation.

18 Claims, 11 Drawing Sheets

U.S. PATENT DOCUMENTS

| | | |
|---|---|---|
| 2007/0208643 A1* | 9/2007 | Gauthereon et al. ......... 705/36 R |
| 2007/0226120 A1* | 9/2007 | Nanjundamoorthy .......... 705/37 |
| 2007/0244785 A1* | 10/2007 | Williams .................... 705/36 R |
| 2008/0071695 A1* | 3/2008 | Haig ........................... 705/36 R |
| 2008/0162377 A1* | 7/2008 | Pinkas ........................ 705/36 R |
| 2009/0063216 A1* | 3/2009 | Kerimov et al. ................... 705/7 |
| 2009/0063365 A1* | 3/2009 | Pinkas ........................ 705/36 R |
| 2009/0099976 A1* | 4/2009 | Kawamoto et al. ......... 705/36 R |
| 2009/0287613 A1* | 11/2009 | Pierdinock et al. ......... 705/36 R |

\* cited by examiner

Figure 11c

INVESTMENT POLICY TOOL

BACKGROUND

Clients with large brokerage accounts may wish to exert control over how their accounts are managed. A client may provide instructions to the broker responsible for their account, setting out goals, guidelines, or even specific transactions the client wishes to make. This form of indirect account management may be efficient for the client, as they need only spend a minimal amount of time talking with their broker. The client may then rely on the broker and the broker's representatives to ensure transactions are carried out pursuant to the client's goals and guidelines. However, because the client is not directly involved in the transactions, it is harder for the client to ensure that the account is being managed in a manner consistent with whatever instructions, goals, and guidelines were given to the broker. The client may need to constantly monitor the account, and may not be able to prevent the broker from engaging in transactions that are counter to the client's goals. If the broker does act in a way that goes against the client's wishes, the client's primary recourse may be to find another broker, necessitating the moving of the entire account. Such a move may be very disruptive to the client's finances.

The client may also directly participate in managing the account, for example using the phone or online trading systems to complete transactions for their account. While directly managing the account may guarantee that the client's wishes are followed, direct management may be time consuming for the client. The client may be an individual with a job who does not have the necessary free time needed for the active management of an account, or a business that does not want to assign an employee to manage the account. Additionally, the client may have the account with the broker in part to take advantage of professional money management, a benefit which would be lost if the client does all of the account management.

For example, the client may want to have no more than 10% of the total assets in their account invested in US Government bonds. If the client chooses to directly manage their account, they may easily prevent any more than 10% of the account from being invested in US Government bonds, but at the expense of the time and energy needed to manage the entire account. The client may tell the broker of this restriction, but the client would not have any enforcement mechanism for the restriction. If the broker or the broker's representatives decided to invest 25% of the client's assets in US Government bonds, the client would not know the restriction had been violated until after the transaction was completed and the client checked the account statement and realized that 25% of the client's assets were now in US Government bonds. At that point, the client may choose to move the account to a different brokerage, possibly incurring losses of time and money.

BRIEF DESCRIPTION OF THE FIGURES

The utility of the embodiments of the invention will be readily appreciated and understood from consideration of the following description of the embodiments of the invention when viewed in connection with the accompanying drawings.

DESCRIPTION

Various embodiments provide methods and systems that can be configured and executed to enforce investment policies created by an account owner. An investment policy tool may receive account data from an account database, including a portfolio and a policy, and a transaction generated by a trader for the account from a trading system. The investment policy tool may use the portfolio and the transaction to generate a speculative portfolio. The transaction and the speculative portfolio may be compared with the policy, to determine if either the transaction or the speculative portfolio violates any elements of the policy. If the investment policy tool determines that the policy has been violated, the investment policy tool may stop the transaction, stop the transaction and notify the account owner of the violation, hold the transaction and request approval from the account owner, or allow the transaction to proceed and notify the account owner of the violation.

Figure 1:
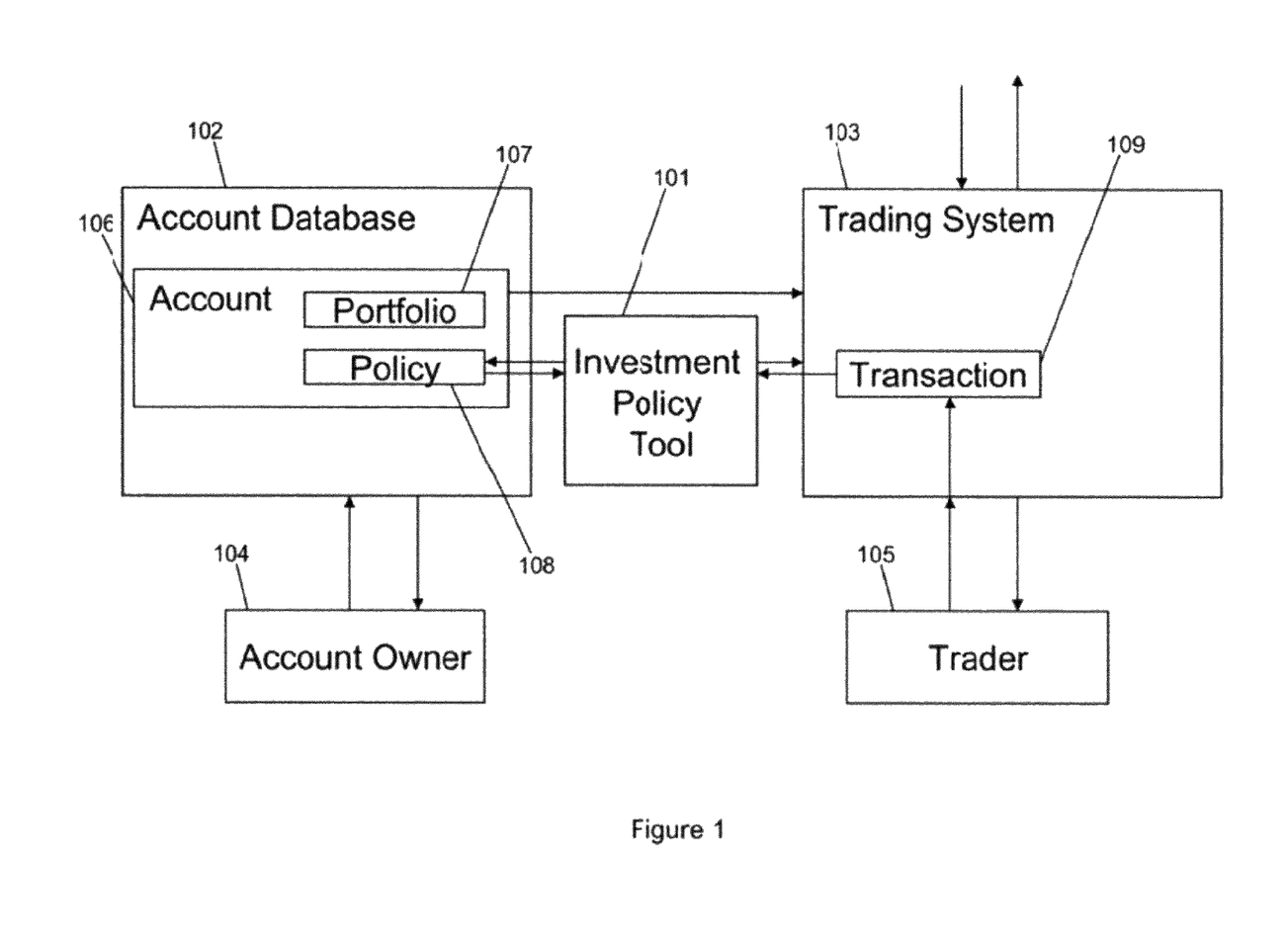
FIG. 1 depicts an exemplary system including an investment policy tool.

FIG. 1 depicts an exemplary system including an investment policy tool 101, an account database 102, and a trading system 103. An account owner 104 may have an account 106 in the account database 102. A trader 105 may use the trading system 103 to create and complete a transaction 109 for the account 106.

The account database 102 may be any suitable combination of hardware and software that serves as a database for any financial institution, such as a bank or brokerage, which maintains accounts for clients. The account 106 may be an account at the financial institution held by a client, the account owner 104. The account 106 may include a portfolio 107 and a policy 108. The portfolio 107 may include records of the account owner 106's assets and liabilities held by or through the financial institution, i.e., cash on deposit, financial instruments owned, outstanding loans, etc. The policy 108 may include rules, parameters, guidelines, or other policy elements created by the account owner 104 that may govern whether or not the transaction 109 is allowed to complete, and what actions to take in the case that the transaction 109 violates any of the elements of the policy 108.

The rules, parameters, guidelines and other policy elements included in the policy 108 may pertain to a variety of categories related to the portfolio 107 and the trader 105. Exemplary rules, parameters, guidelines, or other policy elements may include: trading limits, such as day trading limits, monthly trading limits, yearly trading limits, etc., which may apply to the account 106 as a whole or to the individual trader 105, such that a first trader 105 may have different limits from a second trader 105; investment type restrictions, prohibiting or limiting the purchases of specific financial instruments, for example, allowing only 90% of the portfolio value to be held in stocks, preventing the purchase of bonds rated AA or lower, or restricting the amount of money that may be invested in a specific stock or mutual fund on a daily, weekly, monthly, yearly, etc., basis; transaction limits, limiting, for example, the amount of money that may be involved in any single transaction; portfolio balance guidelines, requiring that certain financial instruments be held in the portfolio 107 in certain ratios to each other, i.e. the value of bond investments must always be at least ⅓ of the value of stock investments in the portfolio 107; risk limits, governing how much risk can be associated with financial instruments held in the portfolio 107 based on, for example, bond ratings, S&P ratings, stock classifications, sector of the economy, etc.

The policy 108 may also include criteria for determining the appropriate action to take when any element of the policy 108 is violated. Actions that may be taken when the policy 108 is violated by the transaction 109 may include sending a notification to the account owner 104, or any other party designated by the account owner 104, stopping the completion of the transaction 109 that is in violation of the policy 108, allowing the transaction 109 to complete, placing the transaction 109 on hold until approval is received, for example, from the account owner 104, and notifying the trader 105 that the transaction 109 will be allowed to complete only if the trader 105 creates a second transaction 109 that, when completed, will remedy the violation of the policy 109. The action triggered by a violation of the policy 108 may be dependent on any relevant criteria, including the identity of the trader 105, the specific nature of the transaction 109, and the state of the portfolio 108. For example, an exemplary transaction 109 may be prohibited when an exemplary portfolio 107 has less then $10,000 in cash, but allowed otherwise.

The policy 108 may also specify that notifications be sent to the account owner 104 on the occurrence of events other than a violation of the policy 108. For example, if more than one individual can modify the policy 108, notifications may be sent to the account owner 104 every time a modification is made to the policy 108. Notifications may also be sent based on changes in the status of the portfolio 107 or assets held in the portfolio 107, i.e., when financial instruments reach their maturity date.

The account owner 104 may create, view, and edit the policy 108 for the account 106. For example, the account owner 104 may have access to the account 106 through a web-based interface. The account owner 104 may use the web-based interface to create, view, and edit the policy 108. FIGS. 5-10 depict exemplary screenshots of various screens for creating, viewing, and editing the policy 108.

Figure 5:
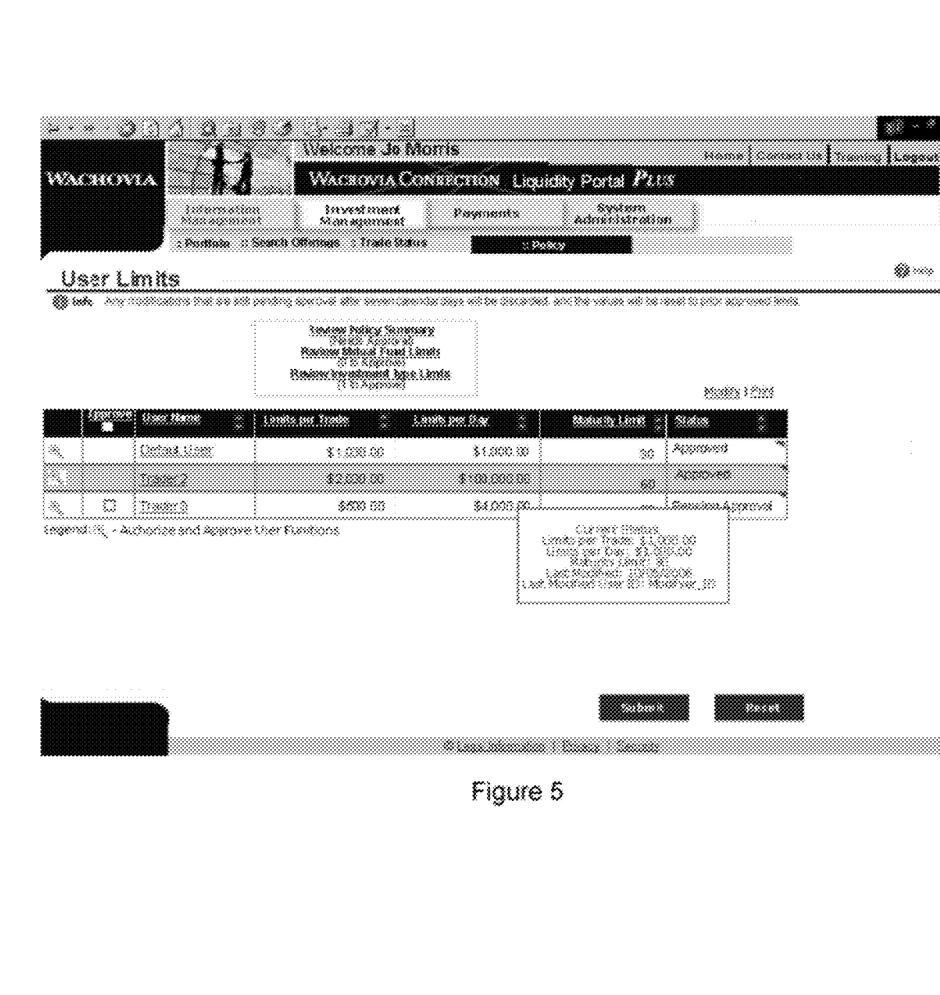
FIG. 5 depicts an exemplary screenshot of a screen for viewing an account's policy regarding individual traders.

FIG. 5 depicts an exemplary screenshot of a screen displaying an account's policy regarding individual traders. The exemplary policy 108 depicted in FIG. 5 has a per trade limit, daily limit, and maturity limit for each of three traders 105. Default User may be, for example, the account owner 104, and the exemplary policy 108 may limit the Default User to $1000 per trade, $1000 per day, and to investments in financial instruments that have a maturity time of no more than 30 days, i.e., Default User cannot invest in any financial instrument that cannot be redeemed until after 30 days have passed. Trader 2 and Trader 3 may each be an exemplary trader 105, and the exemplary policy 108 may place limits on their trading activity. For example, Trader 2 may be limited to $100,000 worth of trades per day, while Trader 3 may be limited to $4000 worth of trades per day.

Figure 6:
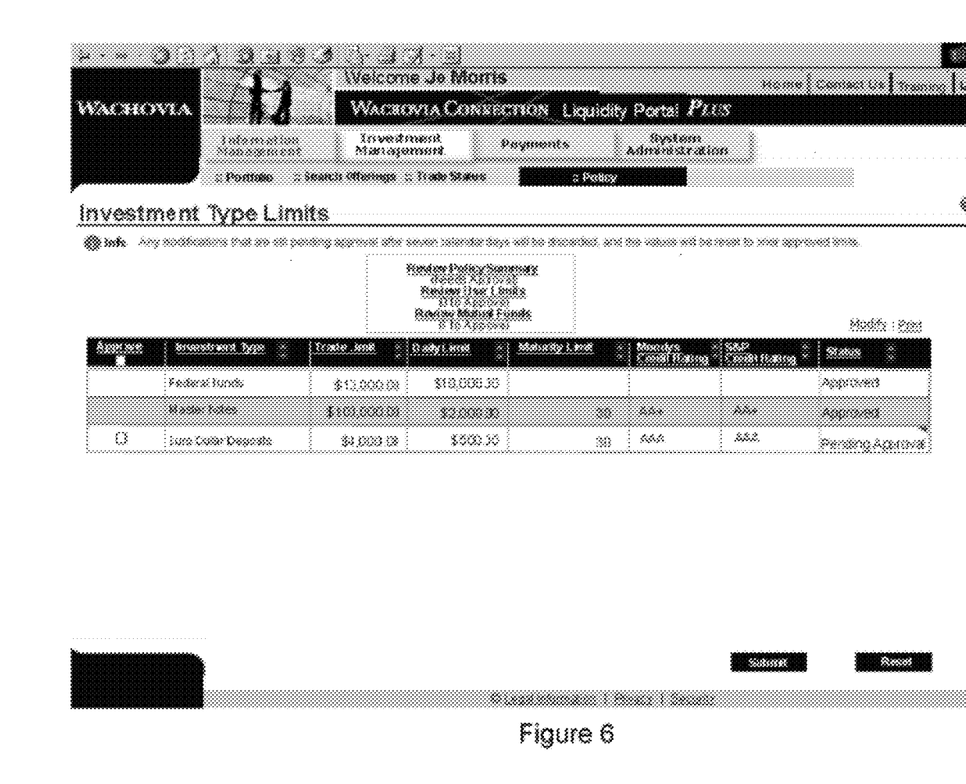
FIG. 6 depicts an exemplary screenshot of a screen for viewing an account's policy regarding investments held in the account.

FIG. 6 depicts an exemplary screenshot of a screen for viewing an account's policy regarding investments held in the account. The policy 108 may include elements that relate to specific investments types. The exemplary policy 108 depicted in FIG. 6 includes restrictions on the Federal Funds, Master Notes, and Euro Dollar Deposits investment types. For example, the exemplary policy 108 includes a $100,000 trade limit and a $2000 daily limit on Master Notes, and restricts investment to only those Master Notes that receive AA+ or better ratings from Moody's and S&P.

Figure 7:
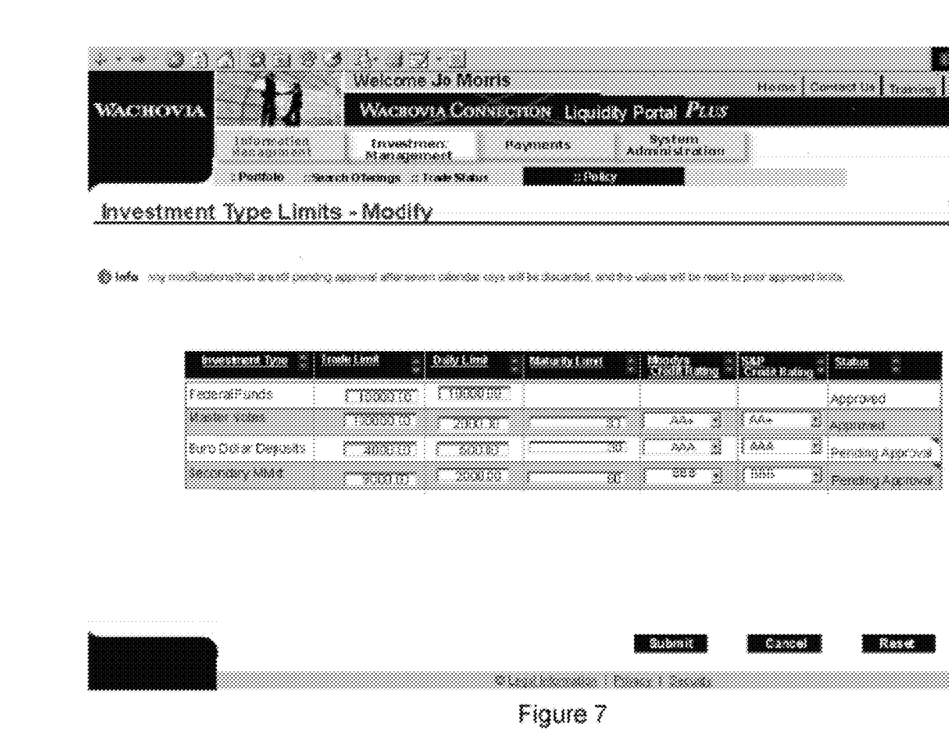
FIG. 7 depicts an exemplary screenshot of a screen for modifying an account's policy regarding investments held in the account.

FIG. 7 depicts an exemplary screenshot of a screen for modifying an account's policy regarding investments held in the account. The account owner 104 may use an interface, for example, a web-based interface, into the account database 102 to access the account 106, and the policy 108. The account owner 104 may then edit the policy 108 using, for example, a web-based screen of text-fields and drop down boxes as depicted in FIG. 7.

Figure 8:
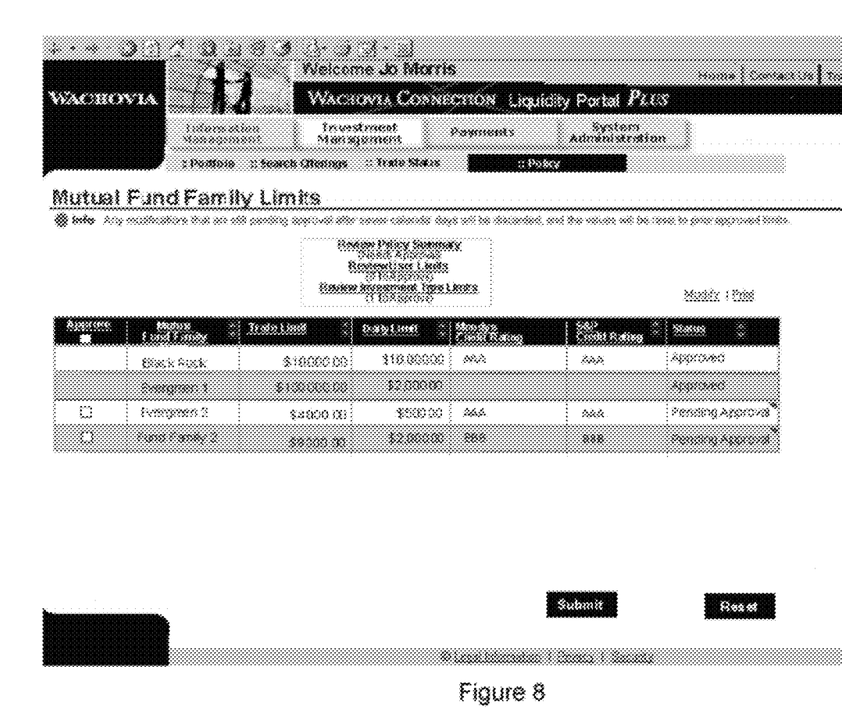
FIG. 8 depicts an exemplary screenshot of a screen for viewing the an account's policy regarding a specific family of investments held in the account.

FIG. 8 depicts an exemplary screenshot of a screen for viewing an account's policy regarding a specific family of investments held in the account. The policy 108 may include elements that relate to a specific investment family. The exemplary policy 108 depicted in FIG. 8 includes restrictions on the four mutual fund families, Black Rock, Evergreen 1, Evergreen 2, and Fund Family 2. For example, the exemplary policy 108 includes a $100,000 trade limit and a $2000 daily limit on Evergreen 1, and also includes a restriction on investments in the Black Rock family of mutual funds to funds that receive AAA ratings from Moody's and S&P.

Figure 9:
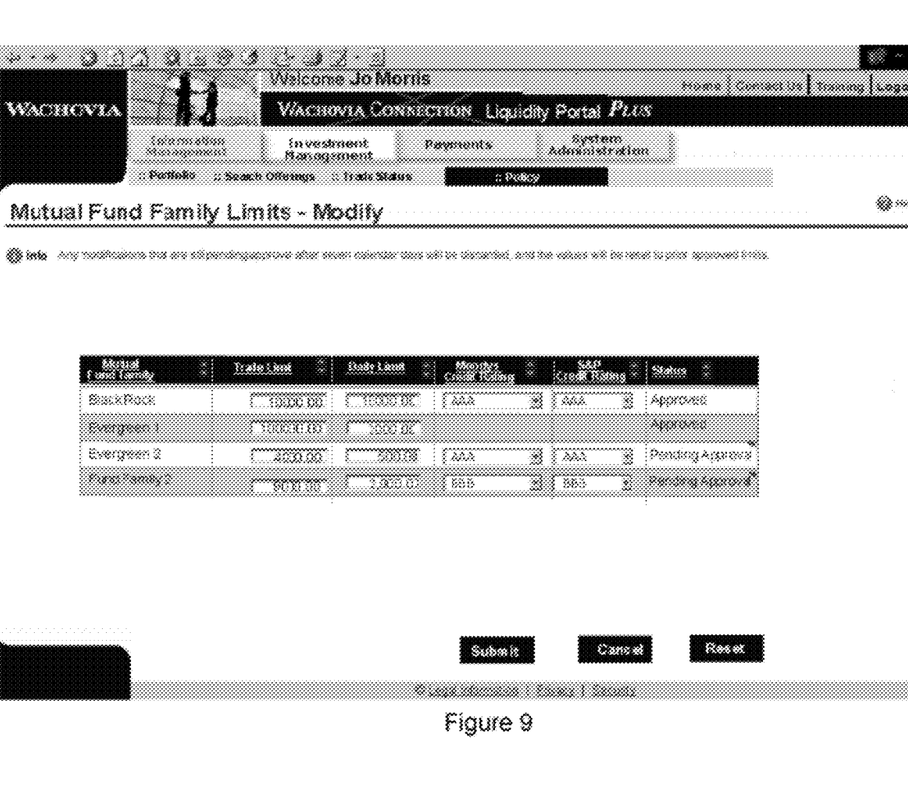
FIG. 9 depicts an exemplary screenshot of a screen for modifying the an account's policy regarding a specific family of investments held in the account.

FIG. 9 depicts an exemplary screenshot of a screen for modifying an account's policy regarding a specific family of investments held in the account. As in FIG. 7, the account owner 104 may use an interface, for example, a web-based interface, into the account database 102 to access the account 106, and the policy 108. The account owner 104 may then edit the policy 108 using, for example, a web-based screen of text-fields and drop down boxes as shown in FIG. 9.

Figure 10:
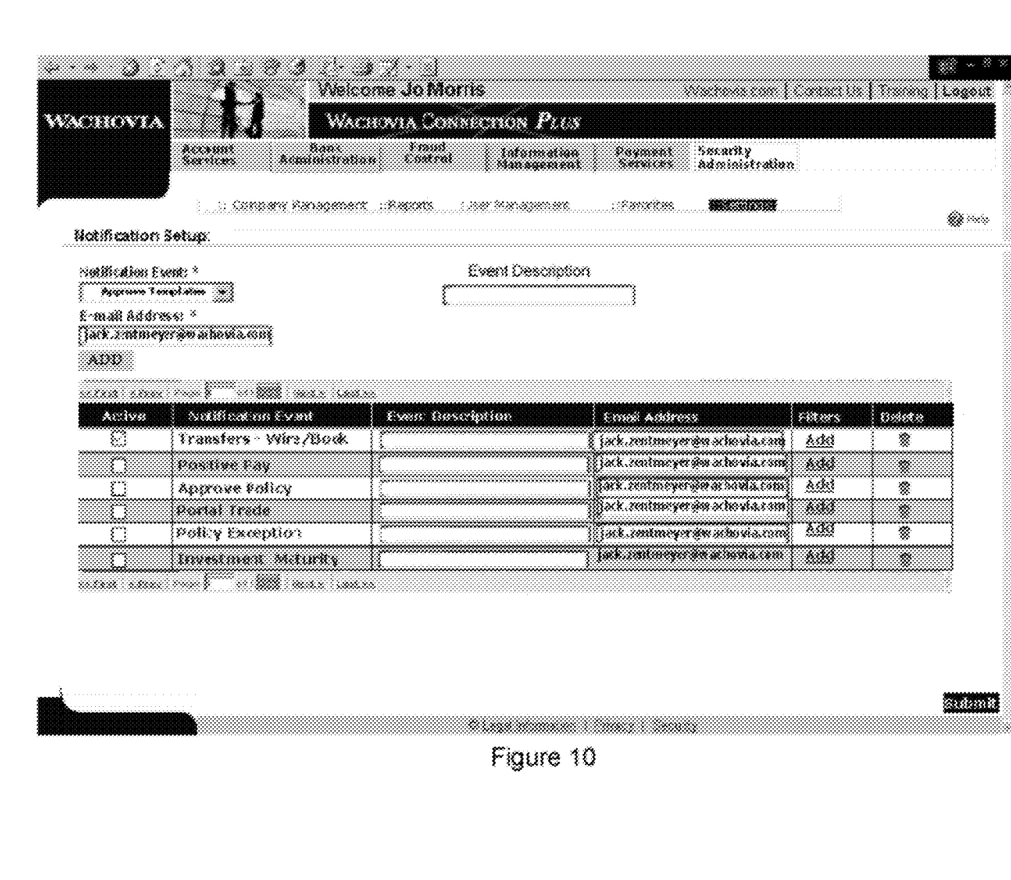
FIG. 10 depicts an exemplary screenshot of a screen for modifying notifications.

FIG. 10 depicts an exemplary screenshot of a screen for modifying notifications. The policy 108 may include various criteria for determining when to send a notification to the account owner 104. For example, the policy 108 may specify that a notification should be sent to the account owner 104 every time a violation of the policy 108 is detected. The notification may be sent to the account owner 104 via any suitable communications means, including, for example, email, SMS message, automated phone call, person-to-person phone call, standard mail, etc, and may include any relevant information about the account 106, the transaction 109, the trader 105, etc, that may be useful to the account owner 104.

The account owner 104 may use an interface, for example, a web-based interface, into the account database 102 to access the account 106, and the policy 108. The account owner 104 may then edit the notifications in the policy 108 using, for example, a web-based screen of text-fields and check boxes as shown in FIG. 10. The account owner 104 may change which criteria are used to determine when a notification is sent, may activate and deactivate different criteria, may edit the manner in which the notification is sent and who the notification is sent to, and may set up filters to go with the criteria to narrow the range of events that trigger a notification. For example, the account owner 104 may set up a filter on the Policy Exception criteria, so that only violations of the policy 108 which involve transactions of $10,000 or more trigger a notification.

The trading system 103 may be any suitable combination of hardware and software used by the trader 105 to create and complete the transaction 109 for the account 106. For example, the trading system 103 may be a computer system used by the trader 105, from which the trader 105 has access to the account 106, market data, and an Electronic Communication Network (ECN) with direct access to various market exchanges in which the trader 105 may make trades. The trader 105 may use the trading system 103 to create the transaction 109. The transaction 109 may be any transaction that changes the composition of assets held in the portfolio 107, for example, using cash in the portfolio 107 to purchase stocks, selling stocks in the portfolio 107 to raise cash, etc. The transaction 109 may be compared to the policy 108 by the investment policy tool 101. If the transaction 109 is allowed, the trading system 103 may be responsible for executing the transaction in the appropriate markets through the ECN.

Figure 2:
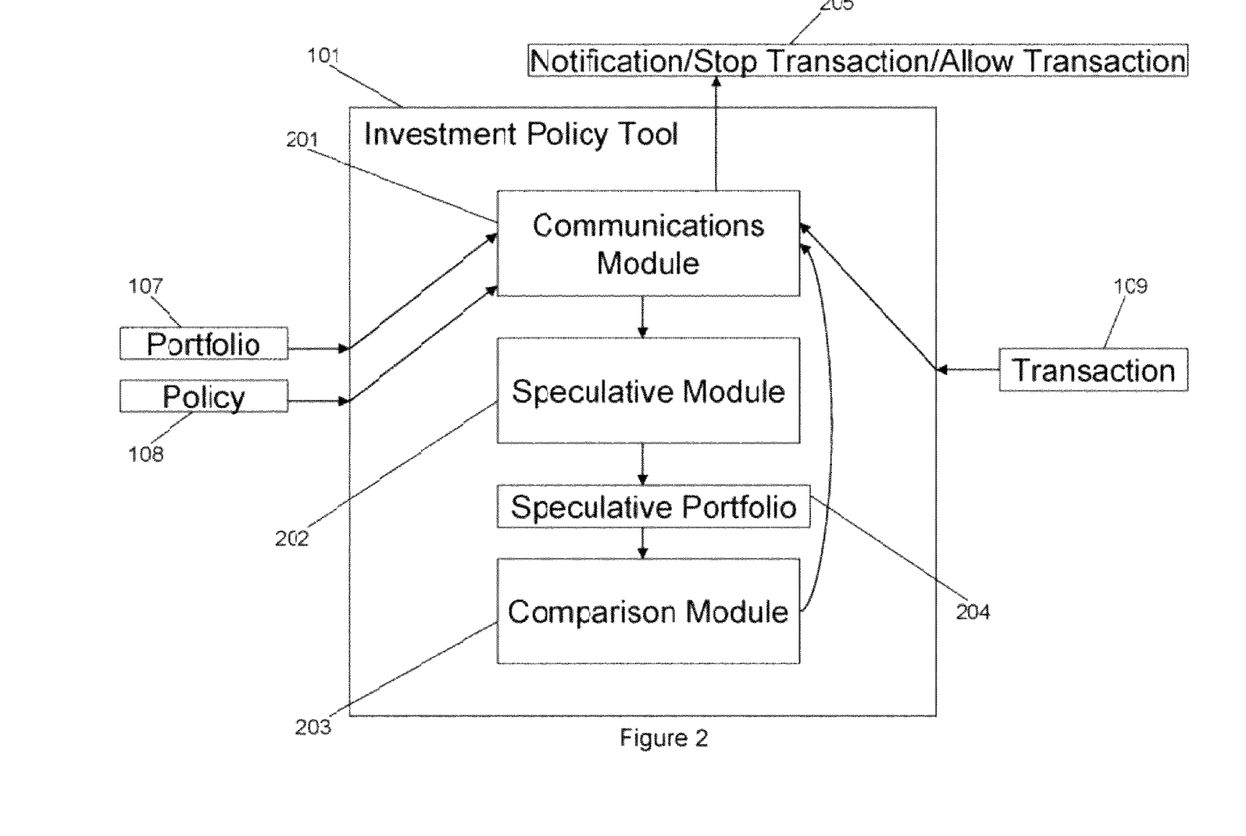
FIG. 2 depicts an exemplary block diagram of an investment policy tool.

FIG. 2 depicts an exemplary embodiment of the investment policy tool 101. The investment policy tool 101 may be implemented on any suitable computer system, and may include a communications module 201, speculative module 202, and comparison module 203.

The communications module 201 of the investment policy tool 101 may be any suitable combination of hardware and software for sending and receiving data, for example, to and from another computer system. The communications module 201 may be communicatively connected to and receive data from the account database 102 and the trading system 103, may pass the data to the speculative module 202 and the comparison module 203, and may transmit data, for example, a stop transaction order to the trading system 103, or a notification to the account owner 104. Data received by the communications module 201 may include the transaction 109 from the trading system 103 and the portfolio 107 and the policy 108 for the account 106 from the account database 102.

The speculative module 202 of the investment policy tool 101 may be any suitable combination of hardware and software for applying the transaction 109 to the portfolio 107 to generate the speculative portfolio 204. The speculative portfolio 204 may reflect the future status of the portfolio 107 if the transaction 109 is allowed to proceed, i.e., what the portfolio 107 will look like after the transaction 109 is completed.

The comparison module 203 may be any suitable combination of hardware and software for comparing the transaction 109 and the speculative portfolio 204 with the policy 108 to determine if the policy 108 has been violated. After the speculative module 202 generates the speculative portfolio 204, the comparison module 203 may compare the state of the speculative portfolio 204 with the policy 108 to determine if the speculative portfolio 204 violates the policy 108. For example, the policy 108 may specify that at least $10,000 must remain in cash at all times, and the speculative portfolio 204 may contain only $4,000 in cash as a result of the transaction 109. In this case, the comparison module 203 would find that the policy 108 has been violated. The comparison module 203 may also compare the transaction 109 with the policy 108, to determine if any of the elements of the transaction 109 violate the policy 108. For example, the policy 108 may not permit investments in airline stocks. If the transaction 109 is for the purchase of airline stocks, the comparison module 203 may find that the transaction 109 violates the policy 108.

The comparison module 203 may produce results including whether or not the policy 108 has been violated, and, if a violation has been found, which of the specific elements of the policy 108 were violated, whether they were violated by the speculative portfolio 204 or the transaction 109, the degree to which the elements of the policy 108 were violated, and any action to be taken in accordance with the policy 108. Actions taken in accordance with the policy may include the sending of notifications to the account owner 104 and/or the sending of stop transaction, hold transaction, or allow transaction orders to the trading system 103. The results produced by the comparison module 203 may be passed back to the communications module 201, which may then send out the results message 205 to the account database 102 and the trading system 103. The results message 205 may include a notification to the account owner 104, a stop transaction order, a hold transaction order, and/or an allow transaction order, as determined by the comparison module 203.

Figure 3:
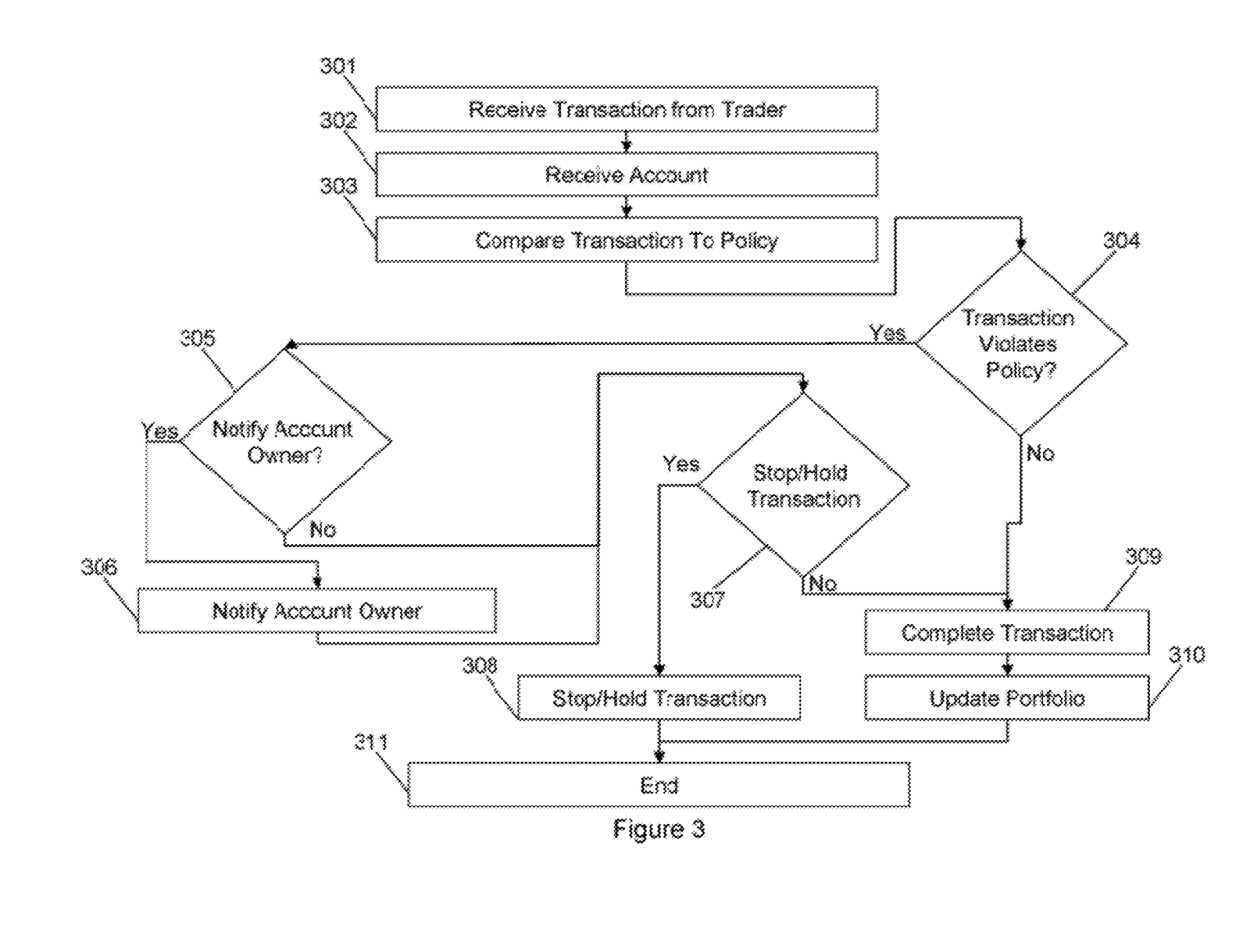
FIG. 3 depicts an exemplary flowchart for using an investment policy tool to implement an account's policy.

FIG. 3 depicts an exemplary flowchart for using an investment policy tool to implement an account's policy. In block 301, the investment policy tool 101 may receive the transaction 109. The trader 105 may use the trading system 103 to create the transaction 109 for the account 106. Before the trading system 103 can execute the transaction 109, the trading system 103 may require approval from the investment policy tool 101. The trading system 103 may send the transaction 109 to the communications module 201 of the investment policy tool 101.

In block 302, the investment policy tool 101 may receive the account 106 from the account database 102. The transaction 109 received from the trading system 103 in block 301 may be related to the account 106 in the account database 102. In order to approve or disapprove the transaction 109, the investment policy tool 101 may need both the portfolio 107 and the policy 108 for the account 106. After receiving the transaction 109 from the trading system 103, the investment policy tool 101 may request the appropriate account 106 from the account database 102. The account database 102 may send the account 106 to the communications module 201 of the investment policy tool 101.

In block 303, the investment policy tool 101 may compare the transaction 109 and speculative portfolio 204 with the policy 109 to determine whether the transaction 109 violates the policy 108. The transaction 109 and the portfolio 107 may be passed from the communications module 201 of the investment policy tool 101 to the speculative module 202. The speculative module 202 may generate the speculative portfolio 204 using the transaction 109 and the portfolio 107. The speculative portfolio 204, the transaction 109 and the portfolio 107 may be passed to the comparison module 203. The comparison module 203 may compare the transaction 109 and the speculative portfolio 204 with the policy 108 to determine if the policy 108 has been violated.

Figure 4:
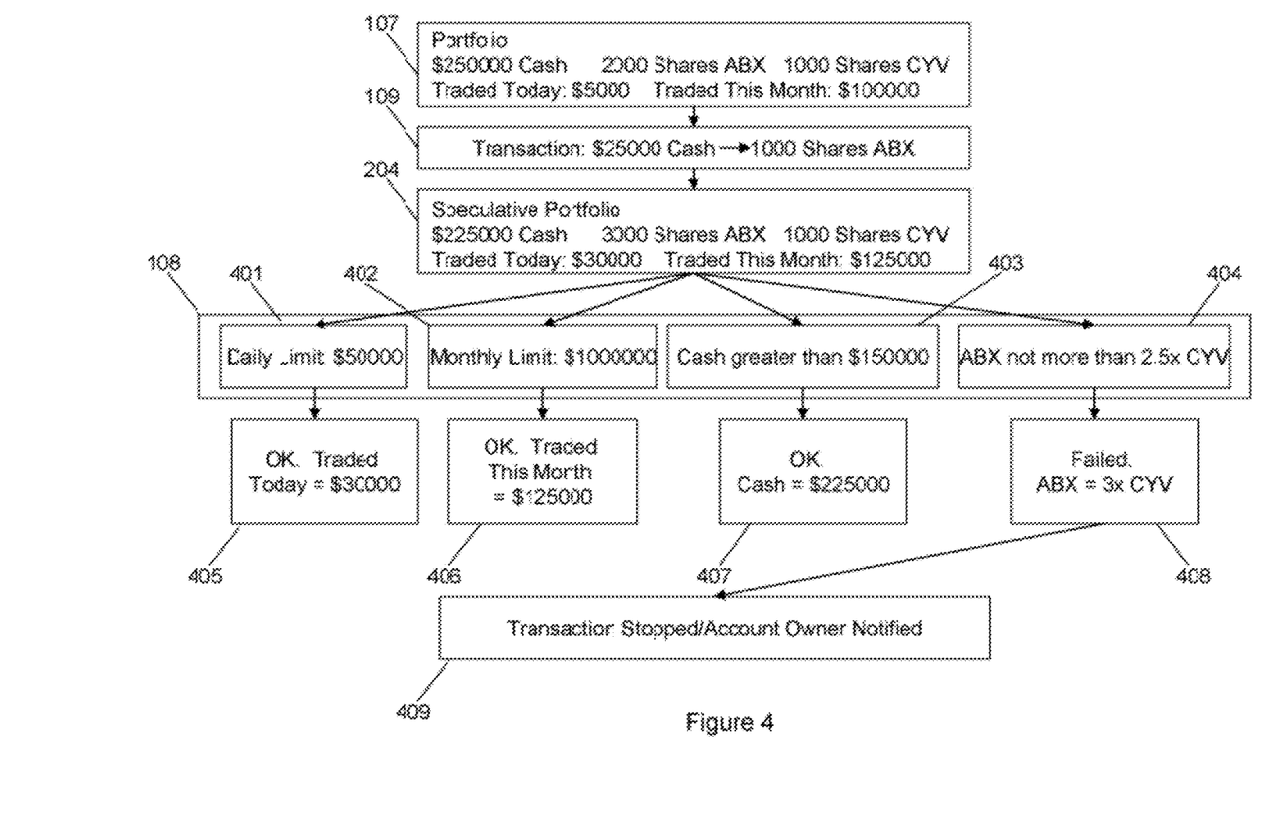
FIG. 4 depicts an exemplary flowchart and block diagram of an investment policy tool determining if a transaction violates an account's policy.

FIG. 4 depicts an exemplary flowchart and block diagram of an investment policy tool determining if a transaction violates an account's policy. The exemplary transaction 109, the purchase of 1000 shares of ABX for $25,000, may be applied to the exemplary portfolio 107 by the speculative module 202 to produce the exemplary speculative portfolio 204. The exemplary speculative portfolio 204 and the exemplary transaction 109 may then be compared to elements 401, 402, 403, and 404 of the exemplary policy 108 by the comparison module 203.

The element 401 of the exemplary policy 108 specifies a daily trading limit of $50,000. The exemplary speculative portfolio 204 indicates that after the exemplary transaction 109 is completed, the exemplary portfolio 107 would have a total of $5000+$25,000=$30,000 traded that day. $30,000 is less than $50,000, therefore the exemplary policy 108 has not been violated on the basis of element 401, as reflected in result 405.

The element 402 of the exemplary policy 108 specifies a monthly trading limit of $1,000,000. The exemplary speculative portfolio 204 indicates that after the exemplary transaction 109 is completed, the exemplary portfolio 107 would have a total of $100,000+$25,000=$125,000 traded that month. $125,000 is less than $1,000,000, therefore the exemplary policy 108 has not been violated on the basis of element 402, as reflected in result 406.

The element 403 of the exemplary policy 108 specifies that the exemplary portfolio 107 must always have more than $150,000 in cash. The exemplary speculative portfolio 204 indicates that after the exemplary transaction 109 is completed, the exemplary portfolio 107 would have a total of $250,000−$25,000=$225,000 in cash. $225,000 is greater than $150,000, therefore the exemplary policy 108 has not been violated on the basis of element 403, as reflected in result 407.

The element 404 of the exemplary policy 108 specifies that the exemplary portfolio 107 cannot have more than 2.5 times the number of shares of ABX as shares of CYV. The exemplary speculative portfolio 204 indicates that after the exemplary transaction 109 is completed, the exemplary portfolio 107 would have a total of 2000+1000=3000 shares of ABX and 1000 shares of CYV. 3000 is more than 2.5 times greater than 1000, therefore the exemplary policy 108 has been violated on the basis of element 404, as reflected in result 407.

Because one of the elements of the exemplary policy 108 has been violated, the comparison module 203 may determine that the exemplary transaction 109 violates the exemplary policy 108. As a result, the comparison module 203 may generate the action 409, based on the exemplary policy 108. Referring back to FIG. 3, in block 304, if the transaction 109 violates the policy 108 as in FIG. 4, the flow proceeds to block 305. Otherwise, flow proceeds to block 309.

In block 305, the policy 108 may be checked to determine if the violation of the policy 108 triggers a notification to the account owner 104. The comparison module 203, after determining that the transaction 109 violates the policy 108, may check the policy 108 for notification criteria based on the transaction 109 and the element or elements of the policy 108 found to be violated. If the policy 108 indicates that the violation should trigger the sending of a notification to the account owner 104, flow proceeds to block 306. Otherwise, flow proceeds to block 307.

For example, referring to FIG. 4, the comparison module 203 may check the exemplary policy 108 for any notification criteria relating to the element 404. If the exemplary policy 108 includes notification criteria triggering a notification for any violation of a rule relating to portfolio balance, such as the element 404, then the violation of the element 404 would trigger a notification. The comparison module 203 may generate the action 409 including a notification to the account owner 104.

In block 306, a notification may be sent to the account owner 104, informing the account owner 104 of the violation of the policy 108. The comparison module 203 may instruct the communications module 201 of the investment policy tool 101 to send the notification to the account owner 205 as part of the results message 205.

Figure 11A:
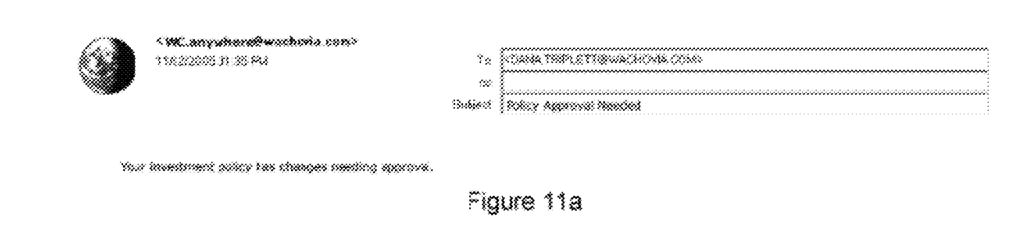
FIGS. 11*a*-11*c* depicts exemplary screenshots of notifications.
Figure 11B:
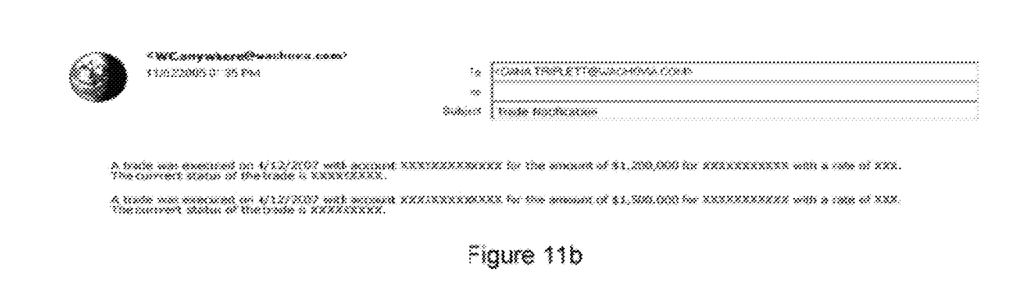
Figure 11C:
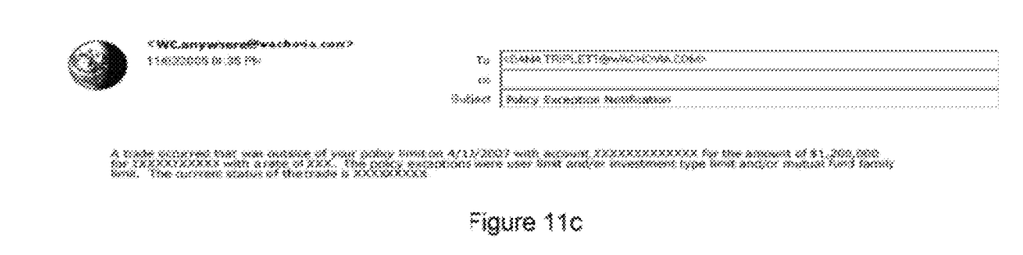

FIGS. 11*a*-11*c* depicts exemplary screenshots of notifications. FIG. 11*a* depicts an exemplary notification sent to the account owner 104 by the account database 102 when changes made to the policy 108 require the approval of the account owner 104. FIG. 11*b* depicts an exemplary notification sent to the account owner 104 when an exemplary transaction 109 that does not violate the policy 108 has been completed the account 106. FIG. 11*c* depicts an exemplary notification sent to the account owner 104 when an exemplary transaction 109 for the account 106 has been found to violate the policy 108. The exemplary notification in FIG. 11*c* may include the date of the violation, the account 106 with the violated policy 108, the details of the transaction 109 that violated the policy 108, the details of the element or elements of the policy 108 found to be violated, and the status of the transaction 109, i.e. stopped, held, or allowed.

In block 307, the policy 108 may be checked to determine if the violation of the policy 108 triggers a stop or hold transaction order. The comparison module 203, after determining that the transaction 109 violates the policy 108, may check the policy 108 to determine if the transaction 109 and/or the element or elements of the policy 108 found to be violated trigger a stop or hold transaction order. If the policy 108 indicates that the violation should trigger either a stop or hold transaction order 104, flow proceeds to block 308. Otherwise, flow proceeds to block 309.

For example, referring to FIG. 4, the comparison module 203 may check the exemplary policy 108 to determine the action to be taken specified by the account owner 104 for violations of the element 404. If the exemplary policy 108 specifies that any violation of the element 404 triggers a stop transaction order, i.e. no transaction that violates the element 404 should be allowed to complete, then the violation of element 404 would trigger a stop transaction order. The comparison module 203 may generate the action 409 including a stop transaction order to be sent to the trading system 103.

In block 308, the transaction 109 may be stopped or held. The comparison module 203 may instruct the communications module 201 of the investment policy tool 101 to send a stop or hold transaction order to the trading system 103 as part of the results message 205. If a stop transaction order is sent to the trading system 103, the trading system 103 may halt the transaction 109, preventing the transaction 109 from completing and removing the transaction 109 from any queue of pending orders. If a hold transaction order is sent to the trading system 103, the trading system 103 may place the transaction 109 on hold, for example, keeping the transaction 109 on a queue of pending orders but preventing the transaction 109 from completing until approval has been received from, for example, the account owner 104. A hold transaction order may also be used to hold the transaction 109 until the trader 105, or another trader 105, creates a second transaction 109 that, when completed, would remedy the violation of the policy 108 by the held transaction 109. For example, if the transaction 109 violates a portfolio balance guideline of the policy 108 resulting in too much stock being held in the portfolio 107, a second transaction 109 may be created to sell enough stock to bring the portfolio 107 back in compliance with the portfolio balance guideline.

For example, referring to FIG. 4, the exemplary policy 108 may specify that any violation of the element 404 triggers a stop transaction order. The communications module 201 of the investment policy tool 101 may receive the results message 405 including the stop transaction order from the comparison module 204. The communications module 201 may send the stop transaction order to the trading system 103. The trading system 103 may stop the transaction 109 from completing.

In block 309, the transaction 109 may be completed. If the transaction 109 does not violate the policy 108, or does violate the policy 108 but not in a way that triggers a stop or hold transaction order, the trading system 103 may complete the transaction 109. The trading system 103 may, for example, execute the transaction 109 on the appropriate market exchange.

In block 310, the portfolio 107 may be updated with the results of the completion of the transaction 109. When the trading system 103 completes the transaction 109, changes may be made to the contents of the portfolio 107. For example, if the transaction 109 is the exchange of $10,000 in cash for 1000 shares of ABX stock, upon completion of the transaction 109 the portfolio 107 may be update to reflect that there is now $10,000 less cash and 1000 more shares of ABX in the portfolio 107.

In block 311, the flow ends.

With reference to FIG. 1, the account owner 104 and the trader 105 may communicate with the account database 102 and the trading system 103 using a variety of devices through a variety of communication media. Examples of devices that may be employed by the account owner 104 and the trader 105 include, without limitation, computer systems, personal digital assistants, notebook computers, and/or telephones (of either wireline or wireless variety). Examples of communication media that can be employed include, without limitation, wireless data networks, wireline networks, and/or a variety of networked media.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A programmable account management system comprising:
    a computer memory; and
    a programmable processor in electronic communication with the computer memory, a programmable account database, a programmable investment policy tool, and a programmable trading system;
    the programmable account database comprising non-transitory memory media storing data associated with an account owned by an account owner, the account comprising a portfolio and a policy; wherein the policy is an investment policy and not a legal compliance policy, and wherein the policy is selected by the account owners;
    the programmable investment policy tool; and
    the programmable trading system comprising a transaction generated by a trader;
    wherein the processor is configured to cause the investment policy tool to check the transaction from the trading system against the policy of the account and wherein:
    if the transaction violates the policy, the processor is configured to cause the investment policy tool to perform at least one of: stopping the transaction and notifying the account owner, stopping the transaction without notifying the account owner, holding the transaction and requesting approval from the account owner, and allowing the trading system to execute the transaction and notifying the account owner, in accordance with the policy, or
    if the transaction does not violate the policy, the processor is configured to cause the investment policy tool to allow the transaction to be executed by the trading system.

2. The system of claim 1, wherein if the transaction violates the policy, the processor is configured to cause the investment policy tool to allow the trading system to execute the transaction if the trader generates a second transaction to remedy the violation of the policy.

3. The system of claim 1, wherein the policy comprises at least one of: trading limits, investment type restrictions, transaction limits, risk limits, and portfolio balance guidelines.

4. The system of claim 1, wherein if the transaction violates the policy, and the investment policy tool holds the transaction and requests approval from the account owner, and the investment policy receives approval from the account owner, then the processor is configured to cause the transaction to be executed by the trading system.

5. The system of claim 1, wherein if the transaction violates the policy, and the investment policy tool holds the transaction and requests approval from the account owner, and the investment policy receives disapproval from the account owner, then the processor is configured to stop the transaction from being executed by the trading system.

6. The system of claim 1, wherein the investment policy tool notifying the account owner is done with at least one of an email, an SMS message, an automated phone call, a person-to-person phone call, and a mailed letter.

7. The system of claim 1, wherein the account owner accesses the account database to perform at least one of creating, viewing, and editing the policy.

8. The system of claim 1, wherein the account owner accesses the account database through a web-based interface.

9. A programmable investment policy tool apparatus comprising:
   a computer memory; and
   a programmable processor in electronic communication with the computer memory, the processor configured to implement a communications module, a speculative module, and a comparison module; the communications module adapted to receive a policy, a transaction, and a portfolio, and to transmit a notification, a stop transaction order, and an allow transaction order; wherein the policy is an investment policy and not a legal compliance policy; and wherein the policy is selected by an account owner;
   the speculative module adapted to speculatively update the portfolio based on the transaction; and
   the comparison module adapted to compare the speculatively updated portfolio and the transaction to the policy to determine if the transaction violates the policy, and instruct the communications module to transmit a message based on a result of the comparing.

10. The apparatus of claim 9, wherein the communications module, the speculative module, and the comparison module are resident in one computer system.

11. The apparatus of claim 9, wherein the communications module, the speculative module, and the comparison module are resident in at least two computer systems communicatively connected.

12. The apparatus of claim 9, wherein the communications module is adapted to transmit the message via at least one of email, an SMS message, an automated phone call, a person-to-person phone call, and a mailed letter.

13. The apparatus of claim 9, wherein the comparison module is further adapted to determine the contents of the message by checking the result against the policy.

14. A computer-implemented method for account management comprising:

receiving by a computer a policy and a portfolio for an account from an account database; wherein the policy is an investment policy and not a legal compliance policy; and wherein the policy is selected by an account owner;
receiving by the computer a transaction generated by a trader from a trading system;
updating by the computer the portfolio with the transaction to generate a speculative portfolio;
comparing by the computer the speculative portfolio and the transaction with the policy to determine if the transaction violates the policy; and
if the transaction violates the policy, performing by the computer at least one of stopping the transaction and notifying the account owner, stopping the transaction without notifying the account owner, holding the transaction and requesting approval from the account owner, and allowing the trading system to execute the transaction and notifying the account owner, in accordance with the policy, or
if the transaction does not violate the policy, allowing by the computer the trading system to execute the transaction if the transaction does not violate the policy.

15. The method of claim 14, further comprising if the transaction violates the policy, allowing by the computer the trading system to execute the transaction if the trader generates a second transaction to remedy the violation of the policy.

16. The method of claim 14, further comprising if the transaction violates the policy and the transaction is held and approval is requested from the account owner, receiving by the computer an approval from the account owner and allowing the transaction to be executed by the trading system.

17. The system of claim 14, wherein if the transaction violates the policy and the transaction is held and approval is requested from the account owner, receiving by the computer a disapproval from the account owner and stopping the transaction from being executed by the trading system.

18. A programmable account management system comprising:
   a programmable account database comprising non-transitory memory media storing data associated with an account owned by an account owner, the account comprising a portfolio and a policy; wherein the policy is an investment policy and not a legal compliance policy; and wherein the policy is selected by the account owner;
   a processor in electronic communication with the account database, the processor adapted to send the account data from the account database to a programmable trading system and a programmable investment policy tool;
   the programmable trading system, the trading system adapted to allow a trader to generate a transaction and to send the transaction to the investment policy tool; and
   the programmable investment policy tool adapted to receive the transaction and the account data, to compare the transaction to the policy, and if the transaction violates the policy to perform at least one of stopping the transaction and notifying the account owner, stopping the transaction without notifying the account owner, holding the transaction and requesting approval from the account owner, and allowing the trading system to execute the transaction and notifying the account owner, in accordance with the policy, or if the transaction does not violate the policy, to allow the transaction to be executed by the trading system.

\* \* \* \* \*